(No Model.) 3 Sheets—Sheet 1.
W. H. JAMES.
METHOD OF AND APPARATUS FOR TREATING THE SMOKE AND FUMES OF METALLURGICAL FURNACES.
No. 488,245. Patented Dec. 20, 1892.
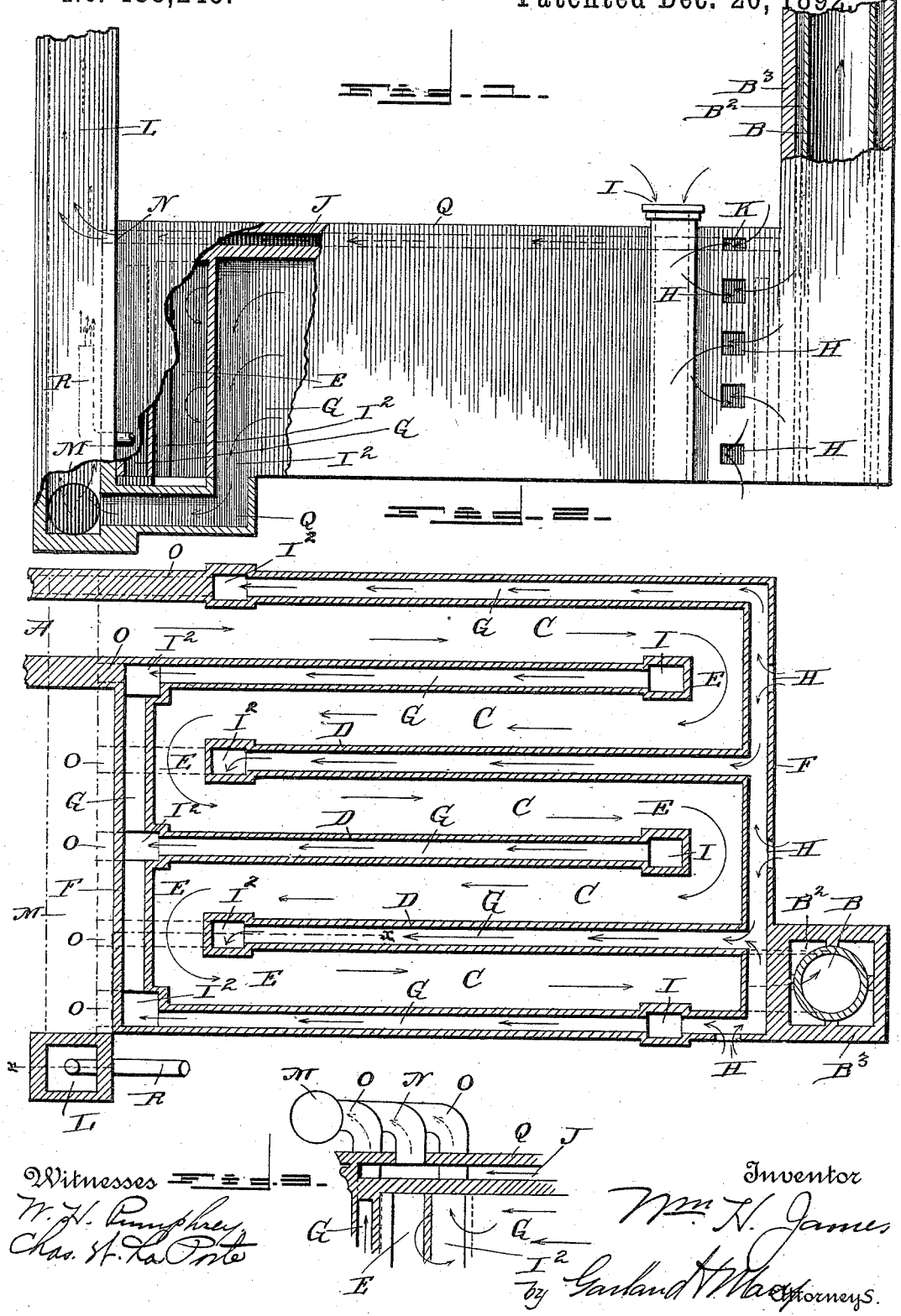

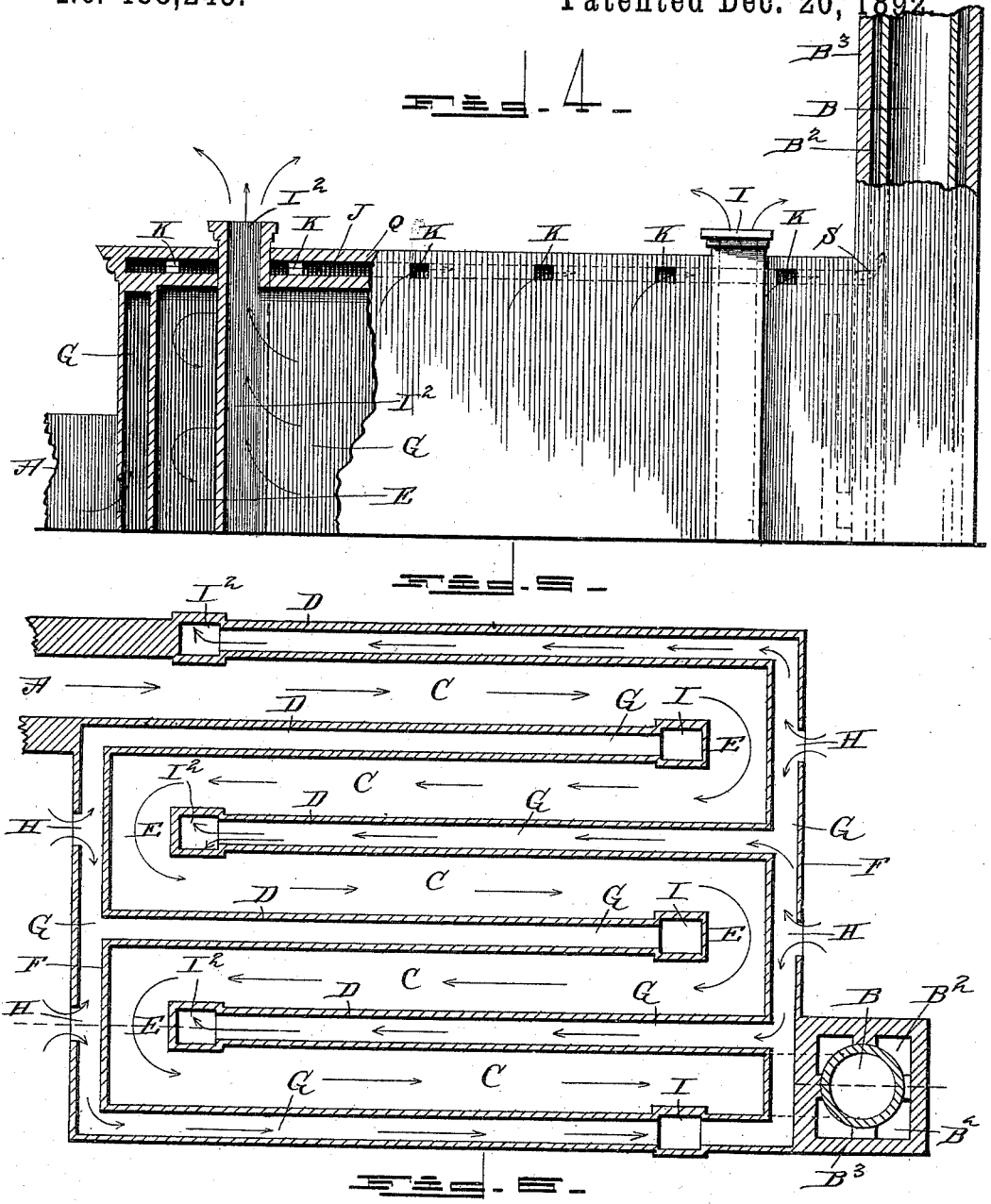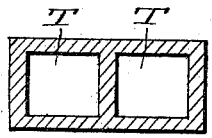

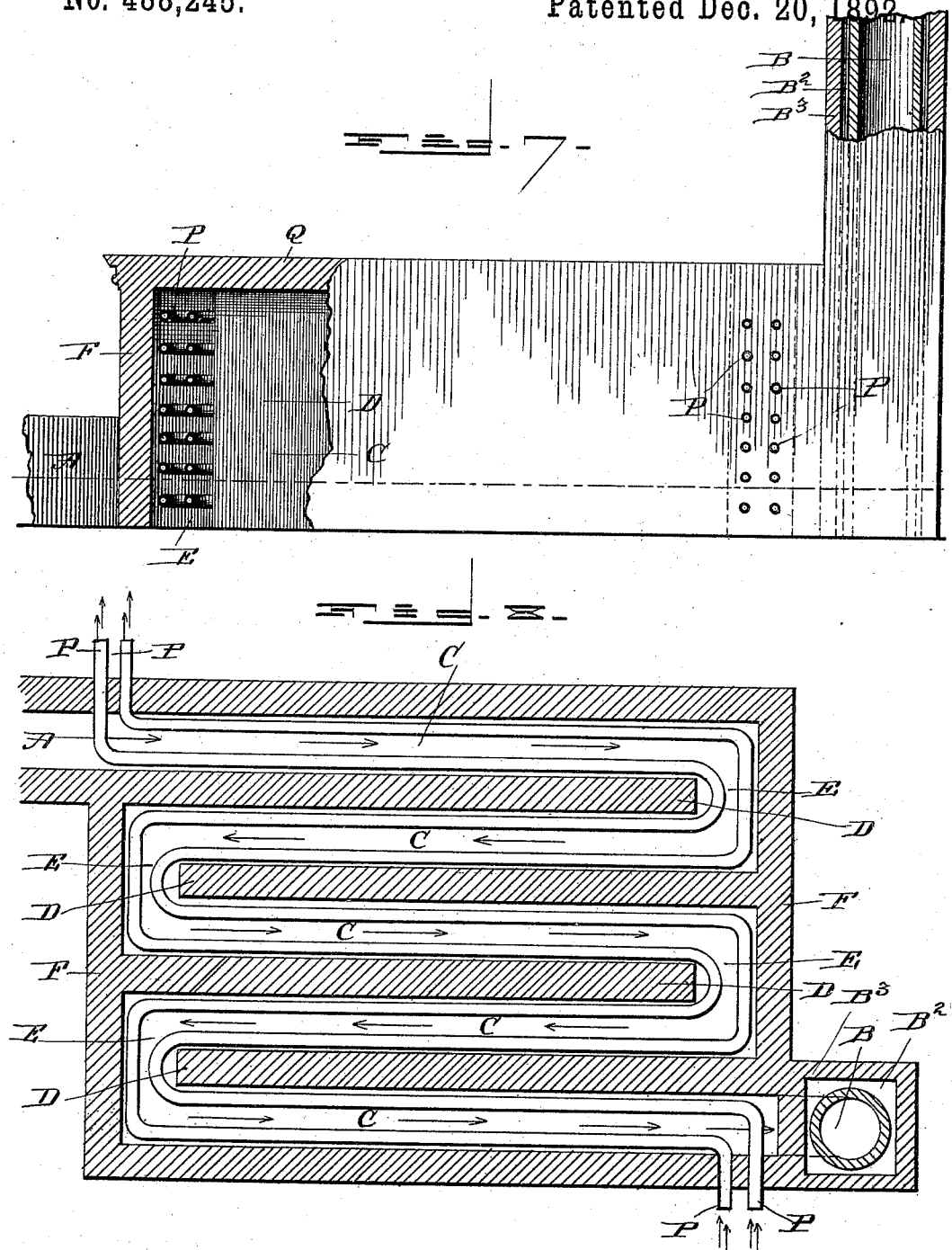

UNITED STATES PATENT OFFICE.

WILLIAM H. JAMES, OF DENVER, COLORADO.

METHOD OF AND APPARATUS FOR TREATING THE SMOKE AND FUMES OF METALLURGICAL FURNACES.

SPECIFICATION forming part of Letters Patent No. 488,245, dated December 20, 1892.

Application filed March 28, 1892. Serial No. 426,853. (No model.)

*To all whom it may concern:*

Be it known that I, WILLIAM H. JAMES, a citizen of the United States, residing at Denver, Arapahoe county, State of Colorado, have invented certain new and useful Improvements in the Method of and Apparatus for Treating the Smoke and Fumes of Metallurgical Furnaces, so as to cause the precipitation of substances contained in the same; and I do hereby declare that the following is a full, clear, and exact description of the invention, such as will enable others skilled in the art to which it appertains to make and use the same, reference being had to the accompanying drawings, forming a part of this specification.

In smelting and refining ores, and especially those containing the precious metals, gold and silver, as well as lead and other minerals, there is usually a portion of the metals lost by being carried off in a volatile form with the gases, smokes, fumes and other products of combustion. This loss is usually supposed to be about one per cent. and various methods and forms of apparatus have been devised and constructed with a view to collecting and saving these volatile products.

My invention relates to a method of and apparatus for treating the smokes, fumes, gases, and other products of combustion generated in smelting, refining or other furnaces. The object of this invention being to provide an apparatus of such peculiar construction whereby a precipitation of the volatilized metals, contained in the escaping current of the products of combustion, gases, fumes &c., from a furnace shall be effected. A further object being to introduce the current of the products of combustion, gases, fumes &c., from a furnace into a cooling chamber; furthermore the said cooling chamber being so arranged whereby the said current of the products of combustion, gases, fumes &c., on its passage therethrough shall be surrounded by an oppositely moving current or cooling agent of a gradually decreasing temperature, to effect a complete precipitation of the volatilized metals which would be otherwise carried off and lost.

With these objects in view, the invention consists in the provision of the construction, arrangement and combination of parts, all of which will be first fully described and then specifically pointed out in the claims.

Reference is had to the accompanying drawings wherein

Figure 1 is an elevation partly in section of my improved apparatus; Fig. 2 is a sectional plan of the same showing the construction of the side and end walls and the partitions of my improved precipitation and condensing or cooling chamber. Fig. 3 is a partially sectional elevation of a slightly modified arrangement of the main flues. Fig. 4 is an elevation partly in section of a modified form of cooling chamber. Fig. 5 is a sectional plan of the construction shown in Fig. 4. Fig. 6 is a cross sectional view of the fire proof partition block which I prefer to use in the construction of the side and end walls, roof and partitions of my cooling or condensing chamber. Fig. 7 is an elevation partly in section, and Fig. 8 is a sectional plan view of a further modified construction of my cooling or condensing chamber.

Similar letters of reference indicate corresponding parts throughout the drawings.

A represents the entrance to the precipitating, cooling or condensing chamber through which pass the smoke, fumes and other products of combustion carrying the volatilized metals which it is the purpose of this invention to recover, directly from the furnace. The cooling or condensing chamber may be of any desired shape or size, but is preferably rectangular. It is provided with side and end walls F, a top or roof Q, and partitions D which are arranged to project alternately from the opposite end walls, leaving a passage way between the ends of the partitions and the opposite side wall thus providing a continuous vertical zig-zag passage way E through the chamber and to the discharge chimney B for the smoke, fumes and other volatilized metal laden products of combustion. By this construction the heated products are passed over a greater amount of cooling surface than could be otherwise provided, and hence can be cooled more rapidly and the precipitation will be more effectual and complete.

Advantageous results are obtained by forcing the smoke, &c. along a vertical zig-zag, passage in that as the column of smoke proceeds through the chamber and becomes cooled it becomes heavier and hence the force of gravity aids in maintaining a circulation thereof through the chamber.

In the ordinary construction the side and end walls, the roof and partitions are cast solid, or are built up of brick or iron. This construction has proven objectionable by reason of the contraction and expansion due to the variations in temperature of the super heated products of combustion on the inside and the temperature of the atmosphere on the outside, thus inducing leaks whereby the products of combustion escape before the metals have been completely precipitated therefrom. Moreover, the super-heated products of combustion passed through the condensing or cooling chamber without being subjected to any greater cooling agent than that due to the conduction and radiation of the side and end walls, bottom and roof of the chamber, are not completely cooled and condensed, and hence fail to yield or precipitate the precious metals carried over in a volatilized form.

Inasmuch as the products of combustion are superheated when they come from the furnace and pass rapidly through the chamber and out through the chimney, the walls, roof and partitions soon become heated to approximately the temperature of the moving products and consequently there is comparatively a very small amount of condensation, the greater portion of the volatilized metals passing out with the waste products through the chimney without being precipitated. These serious objections I overcome by using preferably what is known as fire proof partition tile, a section of which is shown in Fig. 6; made of hard burned clay, in the construction of the walls, partitions and roof of my improved condensing or cooling chamber, though it is to be distinctly understood that I do not limit myself thereto as any other suitable non-combustible material such as brick, terra cotta, or iron may be employed without departing from my invention.

The roof, side and end walls, and partitions of my improved condensing chamber are provided with spaces forming flues for the circulation of a cooling medium. The passages or flues J in the roof Q receive the cooling medium through the inlets K, and discharge the same through the openings N, either into the exhaust pipe L directly, as shown in Fig. 1, or else into the main flue M, and from thence into the exhaust pipe L, as shown in Fig. 3. The passages G in the side and end walls receive the cooling medium through the inlets H and the vertical flues I at the ends of the partitions, and discharge the same through the vertical passages $I^2$, and openings or passages O into the main flue and from thence the cooling medium passes out through the exhaust or discharge L. It will be seen that the column of heated smoke, fumes, &c. is completely surrounded or enveloped by a cooling medium from the moment it enters the condensing or cooling chamber until it leaves at the chimney, and inasmuch as the smoke, fumes, &c., and the cooling medium travel in opposite directions it will be seen that the column of smoke, &c. meets a constantly decreasing temperature as it approaches the exit from the chamber.

In the construction shown in Figs. 4 and 5, the flues I $I^2$ act as the discharge or exhaust for that part of the cooling medium which circulates through the side and end walls and the partitions, each end wall being provided with the inlets H, the passages or flues in the partitions and side wall communicating with those in the end walls and receiving the cooling medium therefrom. The flues in the roof receive their supply of the cooling medium through the inlets K, and discharge the same through the opening S into the air space $B^2$ of the chimney B. By this arrangement, when air is employed as the cooling medium, a circulation is maintained by reason of the fact that the flues I $I^2$, and the walls $B^3$ forming the air space $B^2$ around the chimney B becoming heated from the products of combustion, and being in communication with the atmosphere at each end, perform the functions of a chimney and create a draft.

In the construction shown in Figs. 1 and 2, if desired or if necessary a forced draft may be created and maintained through the pipe R.

In Figs. 7 and 8, I have shown a form of condensing or cooling chamber wherein instead of circulating the cooling medium through passages or flues in the walls, partitions and roof of the chamber, I introduce pipes P which follow the direction of the walls of passage C in its zig-zag course through the condenser, the pipes P entering said passage C at or near the exit at the base of chimney B and leave it at or near the entrance A.

It is evident that each of the three forms of my device shown and described may be used alone or may be combined with either of the others; for instance the pipes shown in Figs. 7 and 8 may be employed in connection with and in addition to the hollow walls, partitions and roofs.

Any suitable cooling medium may be employed, such as the atmospheric air, artificially cooled air, water, brine, ammonia gas, &c., and I do not limit myself to any particular cooling medium.

It will be observed and I consider this a most important feature of my invention, that the cooling medium enters the condensing or cooling chamber at or near the exit therefrom of the products of combustion treated, and flows in a direction opposite to that in which the said products of combustion flow. In this way the heated particles of the products of combustion upon arriving in the condensing chamber meet a current of the cooling medium which grows colder and colder as the said products proceed through the chamber. Thus all the heat atoms of the products of combustion are absorbed by the cooling medium by conduction through the walls of passage C and are radiated into the atmosphere or else through the exhaust L, and consequently all of the volatilized metal coming over from the furnace is completely condensed, becomes separated from the gaseous products, and is precipitated whence it can be collected and used.

I do not desire to limit myself to any specific detail of size or proportion, nor to the specific details of construction shown and described, as the same may be widely varied from, without in the least departing from the spirit and scope of my invention. But Having fully described my invention, what I now claim as new and useful and desire to secure by Letters Patent of the United States, is:—

1. In a cooling chamber, the combination with a series of partitions forming a tortuous flue for the reception of the products of combustion gases fumes &c. from a furnace, of the outer shell or casing inclosing said partitions, said outer shell and partitions being hollow to admit of the passage of an oppositely moving cooling current therethrough, which surrounds said current of the products of combustion, substantially as and for the purpose described.

2. In a cooling chamber, the combination with a series of partitions forming a tortuous flue for the reception of the products of combustion gases, fumes, &c. from a furnace, of an inclosing casing comprising the end and side walls and the roof, all of which are formed with flues to admit of the passage of an oppositely moving cooling current, and a main flue communicating with passages of said side and end walls, roof and partitions, substantially as and for the purpose described.

3. In a cooling chamber, the combination of a series of hollow partitions forming a tortuous flue for the reception of the products of combustion gases, fumes &c. from a furnace, each of said partitions being provided with the inlets I, and outlets I², for the admission and exhaust of a cooling medium, the passages O connecting said outlets with a main flue M, the exhaust pipe L, and an inclosing casing, substantially as and for the purpose described.

4. In a cooling or condensing chamber for treating the fumes, smoke, &c. of smelting or other metallurgical furnaces in the process of reclaiming or recovering substances contained therein in a volatilized or gaseous form, the combination of the side and end walls F, the roof Q, the partitions D, projecting alternately from the opposite end walls and forming a zig-zag passage C through said chamber for the smoke &c. to be treated; a main flue M communicating with an exhaust or exit pipe or flue L, the said roof, partitions, and side, and end walls being provided with passages or flues J and G communicating with said main flue, and also communicating with the air or other cooling medium, a blast device for securing a circulation through said passages or flues, an inlet A at one end of said chamber for the column of smoke, &c. to be treated, and a chimney B at the opposite end of said chamber for creating a draft for said smoke, &c., whereby the said smoke, fumes, &c. laden with volatilized substances are cooled, and said substances are condensed and precipitated, as set forth.

In testimony whereof I affix my signature in the presence of two witnesses.

W. H. JAMES.

Witnesses:
 A. S. FISHER,
 INA E. STEPHENS.